(12) United States Patent
So et al.

(10) Patent No.: US 6,334,715 B1
(45) Date of Patent: *Jan. 1, 2002

(54) MOUNTABLE OPTICAL FIBRE COUPLERS

(75) Inventors: Vincent So; Johnathan So, both of Ottawa (CA)

(73) Assignee: BTI, Photonics, Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/220,538

(22) Filed: Dec. 24, 1998

(51) Int. Cl.[7] .................................................. G02B 6/38
(52) U.S. Cl. ................... 385/60; 385/78; 385/139
(58) Field of Search ............................ 385/53–69, 70–87, 385/88–94, 138, 139, 134–137; 174/48–50, 50.5, 50.51–50.59, 50.6, 50.61–50.64, 51, 52.1–52.6, 53–64

(56) References Cited

U.S. PATENT DOCUMENTS

| | | | |
|---|---|---|---|
| 4,793,683 A | * 12/1988 | Cannon, Jr. et al. | 385/60 |
| 4,822,130 A | * 4/1989 | Maranto et al. | 385/130 |
| 4,852,963 A | * 8/1989 | Lampert | 385/60 |
| 5,067,783 A | * 11/1991 | Lampert | 385/60 |
| 5,073,042 A | * 12/1991 | Mulholland et al. | 385/69 |
| 5,093,885 A | 3/1992 | Anton | 385/134 |
| 5,127,082 A | 6/1992 | Below et al. | 385/135 |
| 5,265,182 A | * 11/1993 | Hartley | 385/77 |
| 5,274,729 A | 12/1993 | King et al. | 385/134 |
| 5,386,486 A | * 1/1995 | Fan et al. | 385/59 |
| 5,613,030 A | 3/1997 | Hoffer et al. | 385/135 |
| 5,717,801 A | 2/1998 | Smiley | 385/60 |
| 5,724,467 A | 3/1998 | vandenEnden et al. | 385/134 |
| 6,022,149 A | * 2/2000 | So et al. | 385/53 |
| 6,083,040 A | * 7/2000 | Mosquera | 439/548 |

* cited by examiner

Primary Examiner—Phan T. H. Palmer
Assistant Examiner—Michelle R. Connelly-Cushwa
(74) Attorney, Agent, or Firm—John C. McMahon (57) ABSTRACT

A fiber optic adaptor is provided which facilitates the connection of either an ST-terminated fiber or an FC-terminated fiber to another FC-terminated fiber, or to some other optical device. The adaptor has a pair of pins mounted on supports connected to an FC coupling receptacle. The pins have extended and retracted positions. When extended, the pins engage the J-shaped slots of the ST-terminated fiber, and when retracted, they are out of the way allowing the FC-terminated fiber to be connected to the receptacle. In another embodiment, an adaptor is provided which facilitates the connection of either an ST-terminated fiber or an SC-terminated fiber to another SC-terminated fiber.

17 Claims, 8 Drawing Sheets

MOUNTABLE OPTICAL FIBRE COUPLERS

FIELD OF THE INVENTION

The invention relates to optical fiber couplers and more particularly to optical fiber couplers which are mountable.

BACKGROUND OF THE INVENTION

In order to connect one optical fiber to another, the fibres to be connected are equipped with connectors at their ends. There are many types of such connectors, the most commonly used in North American telecommunications applications being AT&T's (American Telephone and Telegraph) ST-type connector, and NTT's (Nippon Telegraph and Telephone) FC-type connector. Two fibres which are to be connected are equipped with the same type of connector (FC or ST), and these connectors are each connected to an intermediate optical fibre coupler (sometimes referred to as a coupling receptacle in the case of like connectors or a coupling adaptor in the case of connectors of two different types). A common requirement for any interconnection of optical fibres is that the connector ferrules be cleaned periodically because even a small amount of dust can interfere with optical signal propagation.

It is common to employ optical fibre couplers mounted in a panel forming part of an equipment enclosure thereby facilitating the interconnection of an external optical fibre to an internal fibre inside the enclosure connected to other internal equipment. There are several problems with the available techniques for mounting such optical fibre couplers. Such optical fibre couplers are typically mounted in a hole in the panel with a pair of screws which are difficult to undo. Even after such screws are removed, and the optical fibre coupler is removed, the internal fibre and its connector is still inside the enclosure and it is difficult to access the connector through the hole in the panel because such holes are conventionally smaller in diameter than the diameter of the connector terminating the internal fibre. This makes it very difficult to clean the connector of the internal fibre.

To alleviate these problems special design enclosures have been proposed (see U.S. Pat. Nos. 5,127,082 to Below et al which issued Jun. 30, 1992, 5,613,030 to Hoffer et al which issued Mar. 18, 1997) and optical fibre buildout systems have been proposed (see U.S. Pat. Nos. 5,067,783 to Lampert which issued Nov. 26, 1991, 5,717,801 to Smiley which issued Feb. 10, 1998, 5,073,042 to Mulholland et al which issued Dec. 17, 1991, and 5,274,729 to King et al which issued Dec. 18, 1993). These solutions are not very cost effective.

It may also periodically be a requirement to remove such an optical fibre coupler from a panel in order to replace it with a different type of optical fibre coupler, or to insert a bulkhead fibre optic attenuator for example. This task is also made difficult by conventional optical fibre coupler mounting techniques.

It is noted that both FC and ST-type connectors rely on a ferrule to achieve precise fibre alignment, but they employ different and incompatible latching mechanisms. The ST-type connector relies on a ¼ turn bayonet (spring loaded twist and lock) coupling mechanism, and the FC-type connector relies on a threaded coupling mechanism. In order to interconnect two fibres which are terminated with different connector types, for example an FC-terminated fibre and an ST-terminated fibre, special adaptors are required.

The most commonly used fibre connectors in local area communications include the SC-type connector and the above identified ST-type connector. Again, these connectors use different and incompatible latching mechanisms with the ST-type connector relying on the above identified ¼ turn bayonet coupling mechanism, and the SC-type connector relying on a push-pull coupling mechanism.

Applicant's copending U.S. application Ser. No. 09/019,508 Filed Feb. 5, 1998, hereby incorporated by reference, discloses couplers to facilitate the interconnection of different connector types.

SUMMARY OF THE INVENTION

It is an object of the invention to provide a mechanism for mounting optical fibre couplers which facilitates their removal.

According to a first broad aspect the invention provides an optical fibre coupler mountable to a panel surface having a central hole, the coupler comprising: a first receptacle capable of receiving a first optical fibre connector of a first type; a second receptacle capable of receiving a second optical fibre connector of a second type, the first and second receptacles providing an optical interconnection between the first and second optical fibre connectors when connected; a bushing between said first and second receptacle having a mating surface on a side towards said first receptacle for abutment against the panel surface; at least two parallel pins permanently mounted in said bushing which extend from said mating surface; whereby the coupler is mountable to the panel by inserting the first receptacle through the central hole and by inserting and frictionally removably retaining the at least two pins in pin receiving holes correspondingly located on the panel.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1A:
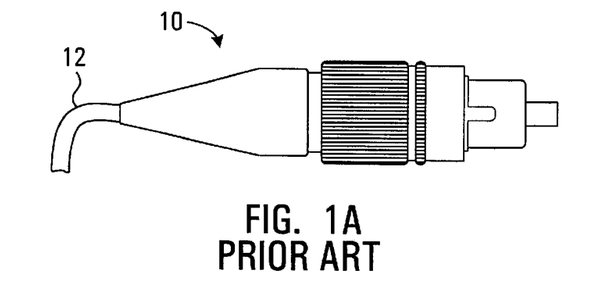
FIGS. 1A and 1B are a side view and an end view respectively of a conventional FC-terminated fibre.
Figure 1B:
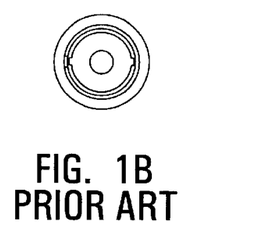
Figure 2A:
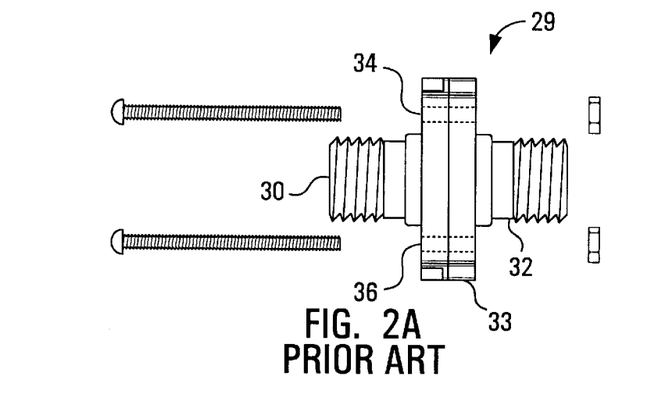
FIGS. 2A and 2B are a side view and an end view respectively of a conventional panel mountable optical fibre coupler for FC-type connectors.
Figure 2B:
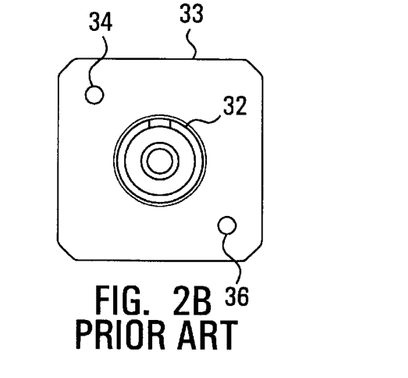
Figure 2C:
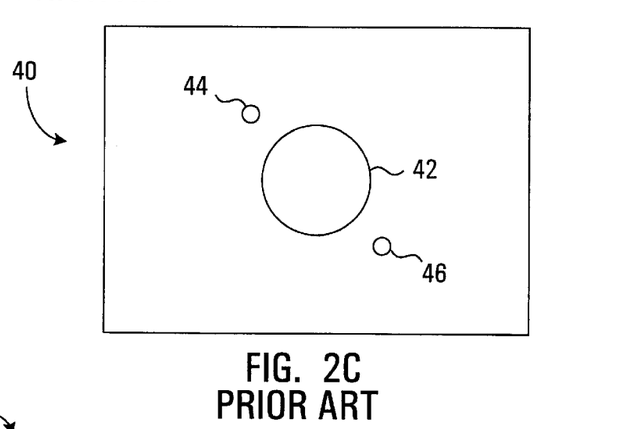
FIG. 2C is a plan view of a panel for receiving a optical fibre coupler of FIG. 2A.

A conventional FC-type connection is made between two FC-terminated fibres each such as the one illustrated in FIGS. 1A (side view) and 1B (end view) through the use of an FC—FC panel mountable optical fibre coupler for FC-type connectors such as the one illustrated in FIGS. 2A (side view) and 2B (end view). The FC-terminated fibre of FIGS. 1A and 1B has an FC-type connector generally indicated by 10 at the end of a fibre 12. The FC—FC optical fibre coupler of FIGS. 2A and 2B is generally indicated by 29 and has at opposite ends a first receptacle 30 and a second receptacle 32 each of which are FC receptacles capable of receiving a FC-type connector. Between the two receptacles 30, 32 is coupling bushing 33 having two holes 34,36 on opposite diagonal corners. A corresponding panel designed to receive the connector 29 is shown by way of example in FIG. 2C and is generally indicated by 40. The term "panel" as used herein refers to any surface in which is to be mounted any optical fibre coupler. Furthermore, it is to be understood that any optical fibre coupler described herein provides an optical interconnection between the two receptacles of the optical fibre coupler, and more particularly provides an optical interconnection between any two connectors installed in the receptacles. The panel 40 has a central hole 42 of a diameter sufficient to receive the receptacle 30, and has two threaded holes 44,46 which are located in correspondence with the holes 34,36 of the coupling bushing 33. The optical fibre coupler 29 can be retained in the panel 40 by inserting the first receptacle 30 into hole 42 until the coupling bushing 33 abuts against the panel 40 and by screwing two screws through holes 34,36 into holes 44,46.

Figure 3A:
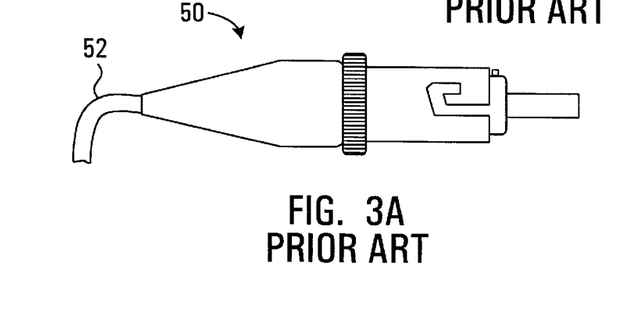
FIGS. 3A and 3B are a side view and an end view respectively of a conventional ST-terminated fibre.
Figure 3B:
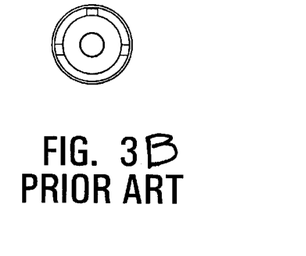
Figure 4A:
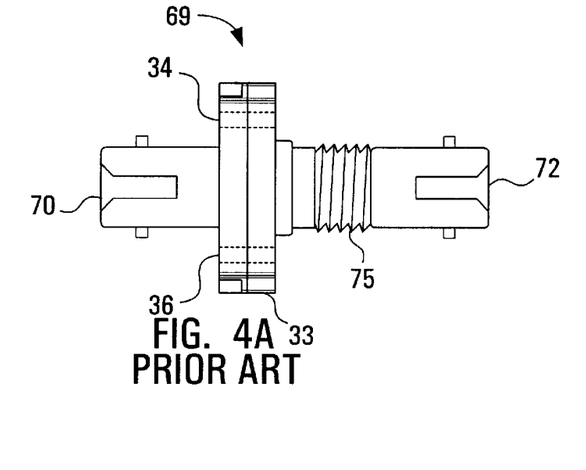
FIGS. 4A and 4B are a side view and an end view respectively of a conventional panel mountable optical fibre coupler for ST-type connectors.
Figure 4B:
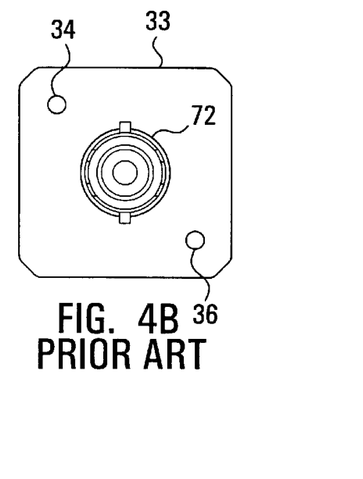

A conventional ST-type connection is made between two ST-terminated fibres each such as the one illustrated in FIGS. 3A (side view) and 3B (end view) through the use of an ST-ST optical fibre coupler for ST-type connectors such as the one illustrated in FIGS. 4A (side view) and 4B (end view). The ST-terminated fibre of FIGS. 3A and 3B has an ST-type connector generally indicated by 50 at the end of a fibre 52. The optical fibre coupler of FIG. 4A is generally indicated by 69 and has a first receptacle 70 and a second receptacle 72 each of which are ST receptacles capable of receiving an ST-type connector. Between the two receptacles is a coupling bushing 33 which is the same in shape and function as that of FIG. 2A again having two holes 34, 36. There may also be a central outside threaded portion 75 which can be threaded into any correspondingly inside threaded item. The optical fibre coupler 69 may be mounted to a panel such as panel 40 of FIG. 2C in the same manner as described previously respecting optical fibre coupler 29 of FIG. 2A.

Figure 5A:
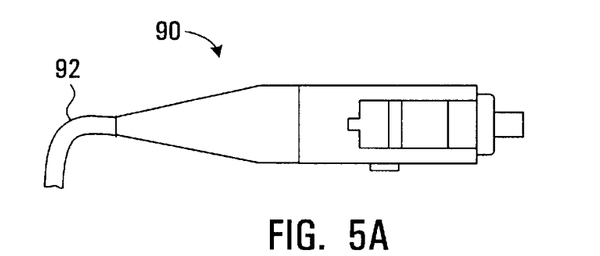
FIGS. 5A and 5B are a side view and an end view respectively of an SC-terminated fibre.
Figure 5B:
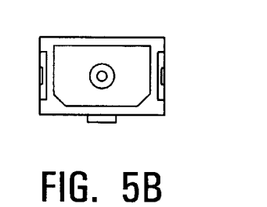
Figure 6A:
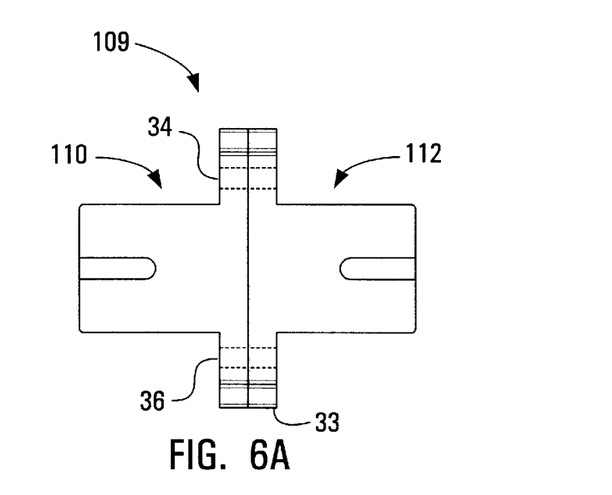
FIGS. 6A and 6B are a side view and an end view respectively of a conventional panel mountable optical fibre coupler for SC-type connectors.
Figure 6B:
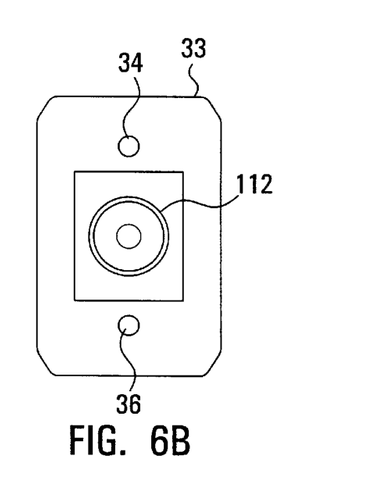

A conventional SC-type connection is made between two SC-terminated fibres each such as the one illustrated in FIGS. 5A (side view) and 5B (end view) through the use of a SC-SC optical fibre coupler for SC-type connectors such as the one illustrated in FIGS. 6A and 6B. The SC-terminated fibre of FIGS. 5A and 5B has an SC-type connector generally indicated by 90 at the end of a fibre 92. The optical fibre coupler of FIGS. 6A and 6B is generally indicated by 109 and has a first receptacle 110 and a second receptacle 112 each capable of receiving an SC-type connector. Between the two receptacles is a coupling bushing 33 which is the same in shape and function as that of FIG. 2A again having two holes 34, 36. The optical fibre coupler 109 may be mounted to a panel such as panel 40 of FIG. 2C in the same manner as described previously respecting optical fibre coupler 29 of FIG. 2A, although the central opening 42 would need to be appropriately sized to receive the rectangularly shaped optical fibre coupler 112.

Figure 7A:
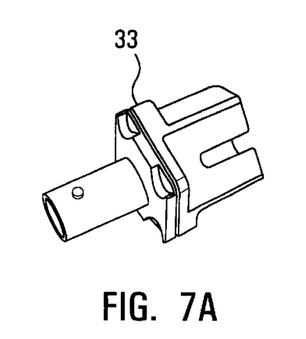
FIGS. 7A, 7B and 7C are perspective views of three different types of optical fibre couplers.
Figure 7B:
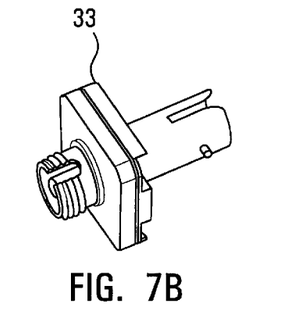
Figure 7C:
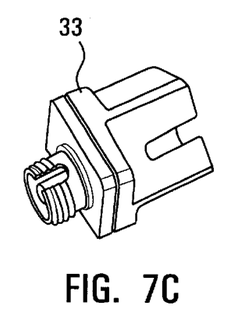

Three further conventional optical fibre couplers are shown in FIGS. 7A, 7B and 7C. The optical fibre coupler of FIG. 7A is designed to couple an ST-terminated fibre to an SC terminated fibre. The optical fibre coupler of FIG. 7B is designed to couple an FC-terminated fibre to an ST terminated fibre. The optical fibre coupler of FIG. 7C is designed to couple an FC-terminated fibre to an SC terminated fibre.

It is noted that any of the optical fibre couplers described above respecting FIGS. 2,4,6,7 may also be implemented to include a built-in attenuation function.

Figure 8A:
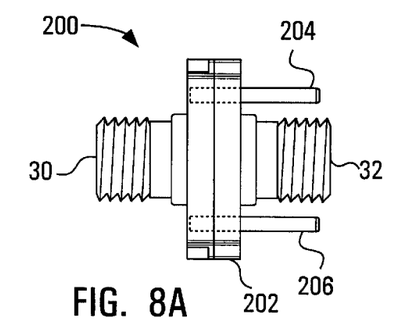
FIG. 8A and 8B are a side view and an end view respectively of an FC—FC optical fibre coupler according to an embodiment of the invention.
Figure 8B:
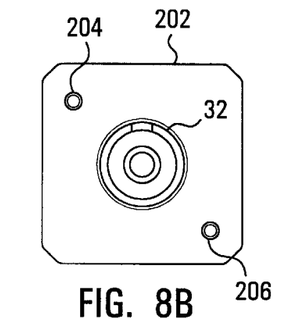

Referring now to FIGS. 8A (side view) and 8B (end view) a FC—FC optical fibre coupler according to an embodiment of the invention is shown, generally indicated by 200. As in the prior art FC—FC coupling bushing of FIG. 2, the coupler 200 has two receptacles 30,32 for receiving FC-terminated fibre connectors. There is a bushing 202 and two spring tension pins 204,206 mounted in holes on opposite diagonal corners of the bushing. The bushing 202 is made with two holes of a size to receive and permanently frictionally retain the two spring tension pins 204,206.

Figure 9:
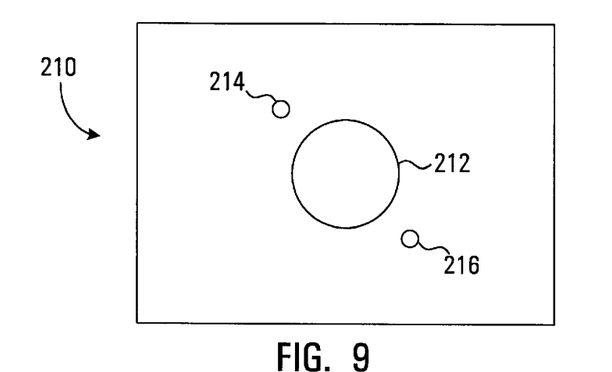
FIG. 9 is a plan view of a panel for use with the optical fibre couplers of FIGS. 8A.

A panel according to an embodiment of the invention for use with the optical fibre coupler of FIG. 8 is illustrated in FIG. 9 and is generally indicated by 210. It includes a central hole 212 for receiving the receptacle 30, and has two holes 214,216 sized to receive and frictionally removably retain the two spring tension pins 204,206.

The spring tension pins may for example be ISO 8752 series pins (manufactured by Spaenaur for example) which have a nominal diameter of 2.0 mm, an outside diameter of 2.3 mm before insertion, and a recommended hole size of 2.1 mm. In this case, the holes for the spring tension pins 204, 206 in the bushing would be 2.0 mm in diameter and the holes 214, 216 in the panel would be 2.1 mm in diameter. Other spring tension pins may of course alternatively be used.

Figure 10A:
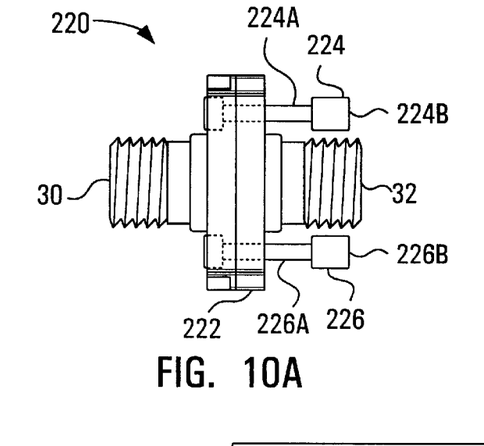
FIGS. 10A and 10B are a side view and an end view respectively of an FC—FC optical fibre coupler according to another embodiment of the invention.
Figure 10B:
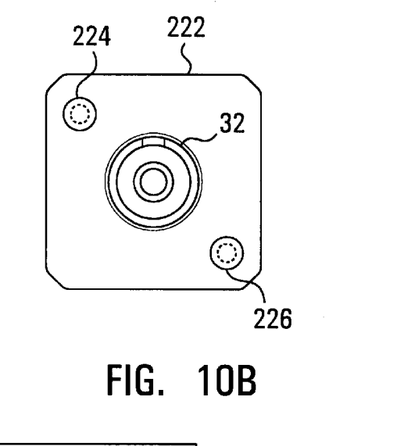

Referring now to FIGS. 10A (side view) and 10B (end view) a FC—FC optical fibre coupler according to another embodiment of the invention is shown, generally indicated by 220. As in the prior art FC-FC coupling bushing of FIG. 2, the coupler 220 has two receptacles 30,32 for receiving FC-terminated fibre connectors. There is a bushing 222 and two locking pins 224,226 on opposite diagonal corners of the bushing. The locking pins 224,226 may be installed by pressure fitting them in holes in the bushing 222. Each locking pin includes a narrow portion 224A,226A and an end portion 224B,226B.

Figure 11:
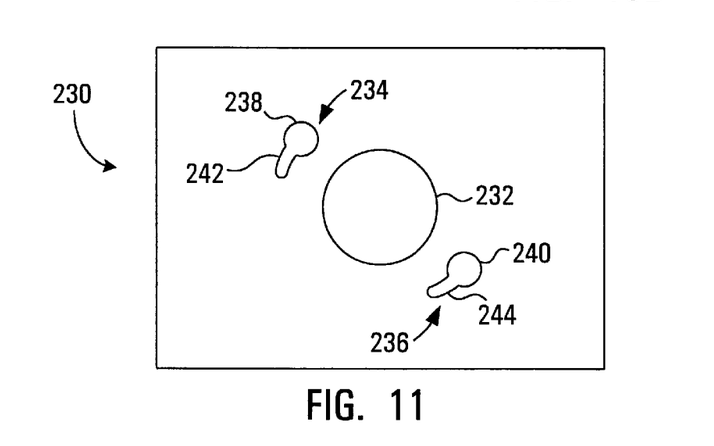
FIG. 11 is a plan view of a panel for use with the optical fibre couplers of FIG. 10A.

A panel according to an embodiment of the invention for use with the optical fibre coupler of FIG. 10A is illustrated in FIG. 11 and is generally indicated by 230. It includes a central hole 232 for receiving the receptacle 30, and has two openings generally indicated by 234,236. The openings 234,236 have large opening portions 238,240 sized to receive the end portions 224B,226B of the locking pins, and engaging portions 242,244 sized to frictionally retain the locking pins 224,226 of the optical fibre coupler of FIG. 10. The frictional retention is achieved through friction between the engaging portions 242,244, and the narrow portions 224A,226A of the locking pins 224,226. To install the optical fibre coupler, the locking pins 224,226 are inserted into portions 238,240, and the receptacle is rotated such that the locking pins move into the engaging portions 242,244.

In a preferred embodiment, the central hole (212,232) in either of the above embodiments in the panel is larger than hole 42 in conventional panels (see FIG. 2C), and more particularly is of a diameter large enough to pass an FC-type connector (see FIG. 1) through the hole. Conventional FC-type connectors typically have a diameter of 10.0 mm, and as such, a preferred diameter for the central hole is 10.1 mm. More generally, the diameter should be at least 0.1 mm larger than the diameter of the connector to be passed through.

The optical fibre couplers of FIGS. 8A and 10A are easily removable for cleaning or exchanging purposes. When used in combination with the preferred panel having a large central opening, the optical fibre coupler can be removed, and the interior connector pulled through the central opening for easy cleaning.

Figure 12:
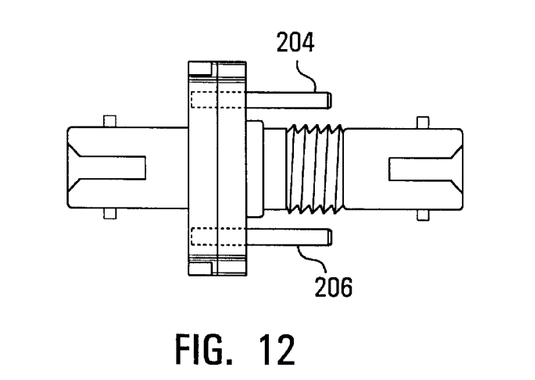
FIGS. 12 and 13 are side views of ST—ST optical fibre couplers according to further embodiments of the invention.
Figure 13:
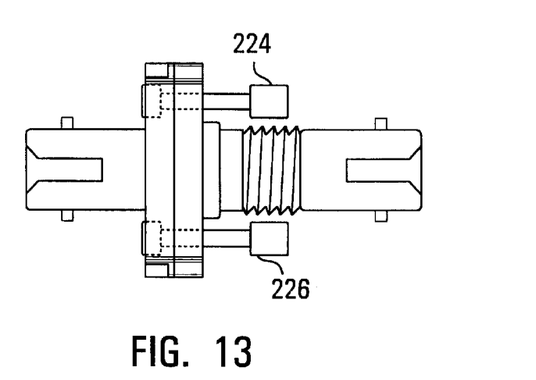

An ST-ST optical fibre coupler equipped with spring tension pins according to an embodiment of the invention is shown in FIG. 12. An ST—ST optical fibre coupler equipped with locking pins according to an embodiment of the invention is shown in FIG. 13. The central threaded portion is not necessary in these embodiments.

Figure 14:
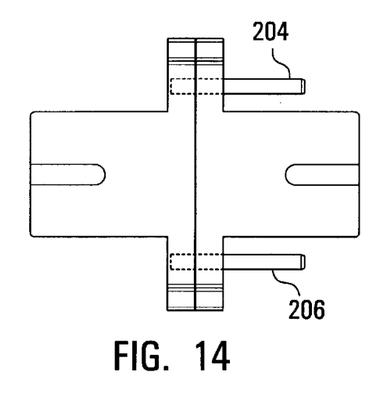
FIGS. 14 and 15 are side views of SC—SC optical fibre couplers according to further embodiments of the invention.
Figure 15:
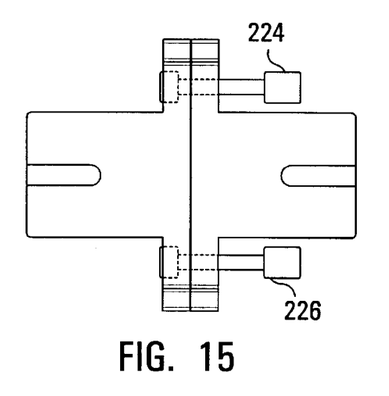

An SC—SC optical fibre coupler equipped with spring tension pins according to an embodiment of the invention is shown in FIG. 14. An SC—SC optical fibre coupler equipped with locking pins according to an embodiment of the invention is shown in FIG. 15.

Figure 16:
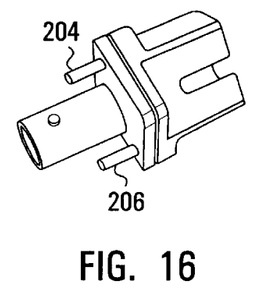
FIGS. 16 and 17 are side views of ST—SC optical fibre couplers according to further embodiments of the invention.
Figure 17:
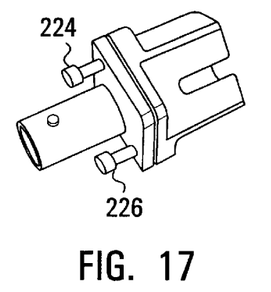

An ST—SC optical fibre coupler equipped with spring tension pins according to an embodiment of the invention is shown in FIG. 16. An ST—SC optical fibre coupler equipped with locking pins according to an embodiment of the invention is shown in FIG. 17.

Figure 18:
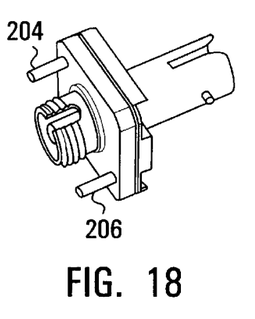
FIGS. 18 and 19 are side views of FC—ST optical fibre couplers according to further embodiments of the invention.
Figure 19:
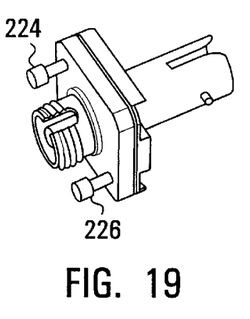

An FC—ST optical fibre coupler equipped with spring tension pins according to an embodiment of the invention is shown in FIG. 18. An FC—ST optical fibre coupler equipped with locking pins according to an embodiment of the invention is shown in FIG. 19.

Figure 20:
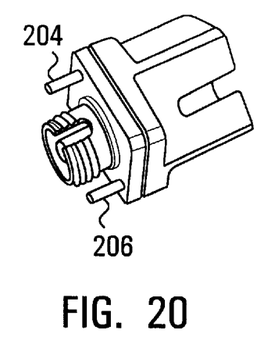
FIGS. 20 and 21 are side views of FC—SC optical fibre couplers according to further embodiments of the invention.
Figure 21:
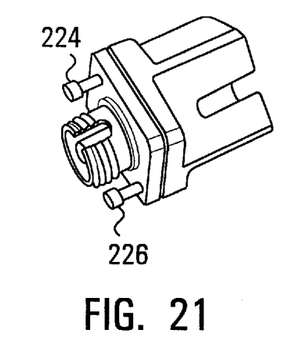

An FC—SC optical fibre coupler equipped with spring tension pins according to an embodiment of the invention is shown in FIG. 20. An FC—SC optical fibre coupler equipped with locking pins according to an embodiment of the invention is shown in FIG. 21.

Figure 22:
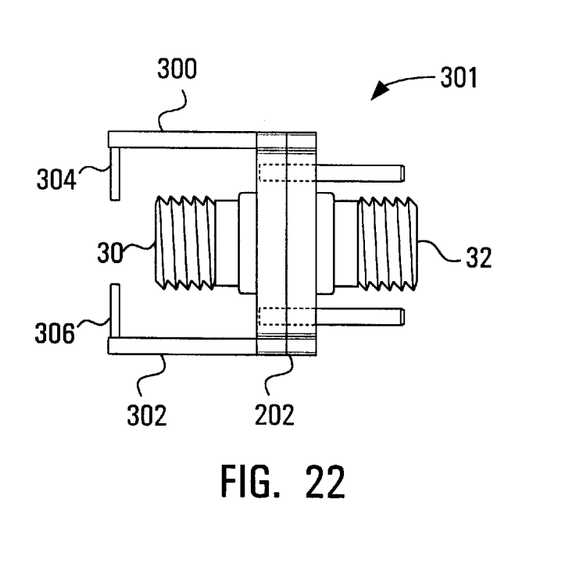
FIG. 22 is a side view of an adapted optical fibre coupler for use in connecting an FC-type connector to an ST-type connector or an FC-type connector according to an embodiment of the invention.
Figure 23:
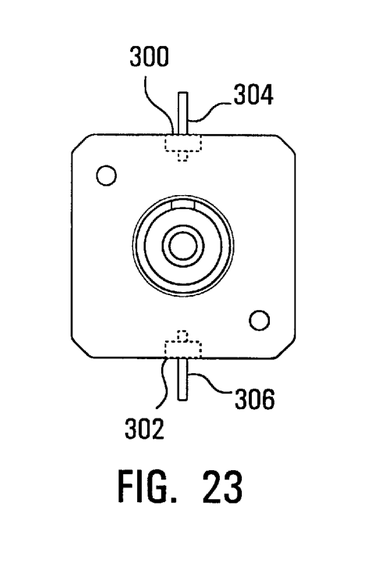
FIG. 23 is an end view of the adapted optical fibre coupler of FIG. 22.

Referring to FIG. 22, in another embodiment of a FC—FC optical fibre coupler, in addition to the features of the optical fibre coupler of FIG. 8, adaptor pin supports in the form of arms 300,302 protrude at right angles from the bushing 202 and on opposite sides of the bushing 202. Each arm 300,302 has a respective retractable adaptor pin 304, 306. These adaptor pins 304,306 are described in detail below. An optical fibre coupler including such arms and pins will be referred to as an adapted optical fibre coupler and is generally indicated by 301. The retractable adaptor pins 304,306 in FIG. 22 are in their extended position, while the same adaptor pins are shown in FIG. 23 (end view) in their retracted positions. The adapted optical fibre coupler 301 of FIG. 23 is now capable of being used to connect a pair of FC style connectors, or an FC connector and an ST connector.

Figure 24:
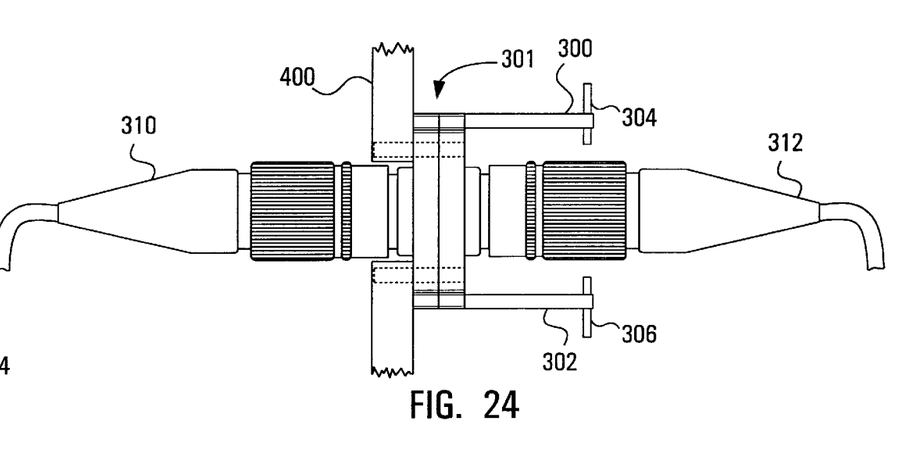
FIG. 24 is a side view of an FC-terminated fibre connected to an FC-terminated fibre using the apparatus of FIG. 22.
Figure 25:
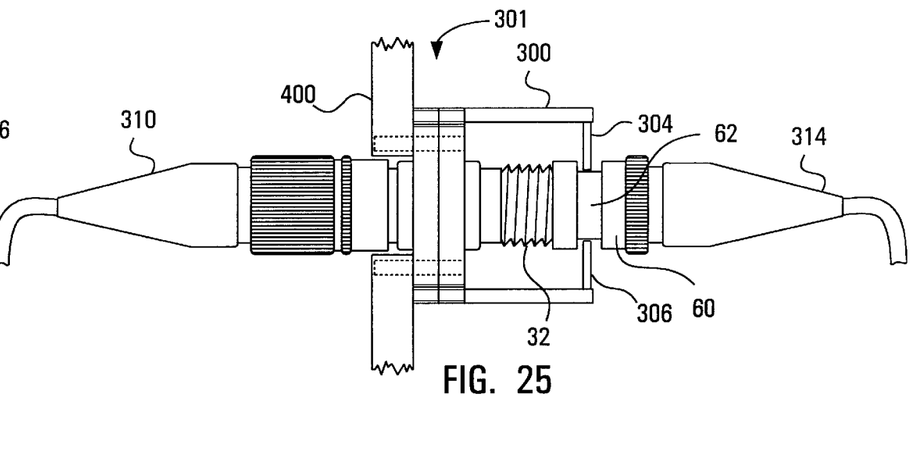
FIG. 25 is a side view of an FC-terminated fibre connected to an ST-terminated fibre using the apparatus of FIG. 22.

In FIG. 24, the adapted optical fibre coupler 301 is used to connect two FC-type connectors 310,312. In this configuration, the adaptor pins 304,306 are moved to their retracted position, and the adapted optical fibre coupler functions in its normal mode. In FIG. 25, the adapted optical fibre coupler 301 is used to connect an FC-type connector 310 to an ST-type connector 314. In this configuration, the adaptor pins 304,306 are moved to their extended position. One of the two receptacles of the adapted optical fibre coupler functions in its normal mode to couple to the FC-type connector 310. On the other side, the ferrule of the ST connector 314 is inserted inside the inner cylinder of the remaining FC receptacle 32. The inner cylinder of the receptacle 32 butts against the inner cylinder of the connector 314, and the spring loaded outer portion 60 is pressed towards the adapted optical fibre coupler 301 so as to receive the two adaptor pins 304,306 in its J-shaped notches. The spring loaded outer portion 60 is then rotated to catch the pins 304,306 in the end portions of the J-shaped notches 62.

The necessity for the adaptor pins 304,306 to engage the J-shaped notches 62 of the ST-type connectors imposes requirements upon the dimensions of the optical fibre coupler. It is important that the adaptor pin supports 304,306 be connectable to the FC receptacle in a manner which supports the pins in positions perpendicular to the longitudinal axis of the receptacle and on opposite sides of the receptacle such that they do not interfere with the connection of an FC-type connector to the FC receptacle when they are in their retracted position. It is also important that the adaptor pins when extended are capable of engaging the J-shaped notches of an ST-type connector.

There are many ways to implement the adaptor pins 304,306. The adaptor pins may be implemented as a pair of spring pins which are biased towards their extended positions but which may be compressed to their retracted positions. The adaptor pins may be implemented with a pair of screws which can be screwed into the arm portions to their extended positions, or partially unscrewed from the arm portions to their retracted positions.

In another example the adaptor pins may be provided with first and second spaced ring notches within which to receive a ball bearings which are spring loaded within the arms in which they are mounted.

The arm portions may be separate pieces initially from the bushing or may be integrated all as one unit.

The embodiment of FIGS. 22–25 features spring tension pins to enable mounting the optical fibre coupler to a panel

400. Of course, alternatively, locking pins may be used, provided the corresponding receiving holes exist in the panel 400.

Figure 26:
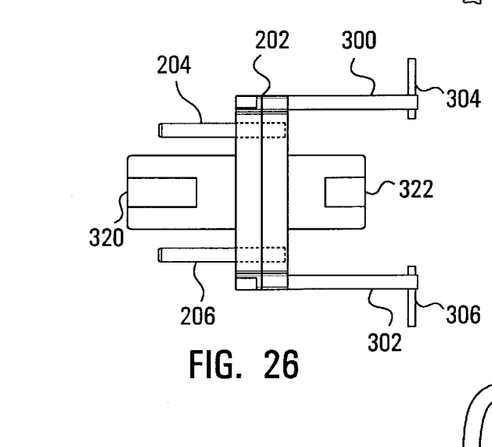
FIG. 26 is a side view of an adapted optical fibre coupler for ST and SC-type connectors according to an embodiment of the invention.
Figure 27:
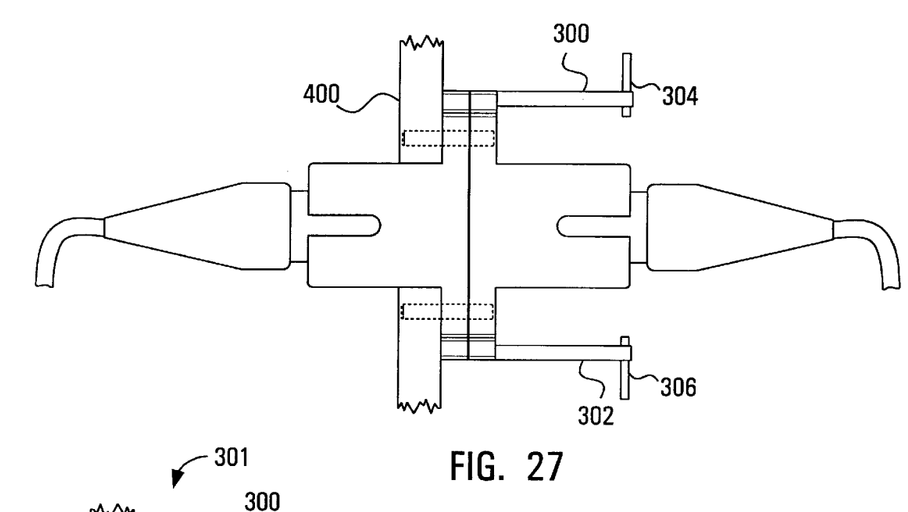
FIG. 27 is a side view of two SC-terminated fibres connected using the apparatus of FIG. 26.

Referring now to FIG. 26, one of the two SC-type receptacles 320,322 of the SC—SC type optical fibre coupler of FIG. 14 has been adapted according to an embodiment of the invention to permit either an SC—SC connection or an SC—ST connection. In this case, the outer rectangular portion of the adapted receptacle 322 has been shortened. Two adaptor pin supports 300,302 retractable adaptor pins 304,306 preferably are integrated with the bushing 202. It is important that the adaptor pin supports 300,302 be connectable to the SC receptacle in a manner which supports the adaptor pins in positions perpendicular to the longitudinal axis of the receptacle and on opposite sides of the receptacle such that they do not interfere with the connection of an SC-type connector to the SC receptacle when they are in their retracted position. It is also important that the adaptor pins when extended are capable of engaging the J-shaped notches of an ST-type connector. With the adaptor pins 304,306 retracted, a normal SC—SC connection may be made such as illustrated in FIG. 27. With the adaptor pins 304,306 extended, an SC—ST connection may be made such as illustrated in FIG. 28.

Figure 28:
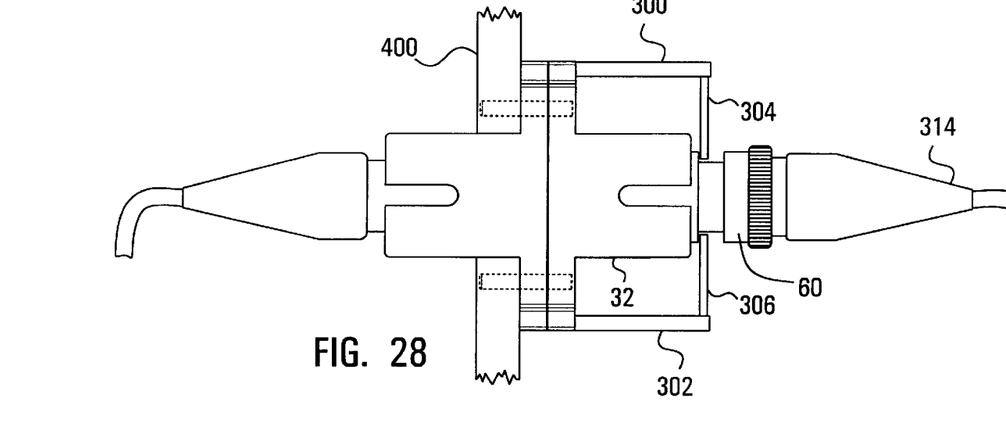
FIG. 28 is a side view of an SC-terminated fibre connected to an ST-terminated fibre using the apparatus of FIG. 26.

The embodiment of FIGS. 26–28 features spring tension pins. Of course, locking pins could alternatively be used.

Numerous modifications and variations of the present invention are possible in light of the above teachings. It is therefore to be understood that within the scope of the appended claims, the invention may be practised otherwise than as specifically described herein.

While in the above described embodiments, the interface between the optical fibre coupler and the panel has included a pair of flat surfaces, more generally, the panel will have a surface, and the optical fibre coupler will have a corresponding mating surface.

Preferably the spring tension pins or locking pins extend perpendicular to the bushing but this is not essential provided the holes in the panel are correspondingly angled. While two spring tension pins (or two locking pins) have been used in the examples, of course additional pins may be used.

Three types of receptacles, namely FC, ST and SC have been considered in the above examples. Of course, the invention may be applied to either receptacle types.

The embodiments of the invention in which an exclusive property or privilege is claimed are defined as follows:

1. An optical fibre coupler mountable to a panel surface having a central hole and a flat surface, the coupler comprising:
   a first receptacle capable of receiving a first optical fibre connector of a first type;
   a second receptacle capable of receiving a second optical fibre connector of a second type, the first and second receptacles providing an optical interconnection between the first and second optical fibre connectors when connected;
   a bushing between said first and second receptacle having a mating surface on a side towards said first receptacle for abutment against the panel surface;
   at least two non-threaded parallel pins mounted in said bushing which extend from said mating surface;
   whereby the coupler is mountable to the panel by inserting the first receptacle through the central hole and by inserting and frictionally removably retaining the at least two pins in pin receiving holes correspondingly located on the panel; and
   wherein each of said first and second receptacles is either an FC-type receptacle, an SC-type receptacle, or an ST-type receptacle.

2. A coupler according to claim 1 in combination with said panel wherein the central opening in said panel is sufficiently large to allow a fibre optic connector to fit through the central opening.

3. A coupler according to claim 1 wherein said first and second receptacles are both FC-type receptacles.

4. A coupler according to claim 3 in which said second FC receptacle is adapted to be able to receive either an FC-type connector or an ST-type connector having J-shaped notches, the coupler further comprising:
   two adaptor pin supports extending from said bushing in a direction opposite to said spring tension pins, and two adaptor pins, the pin supports supporting the two adaptor pins in positions perpendicular to a longitudinal axis of the second FC receptacle and on opposite sides of the longitudinal axis of the receptacle in a manner which does not interfere with the connection of an FC-type connector to the FC receptacle;
   the two adaptor pins being mounted retractably in said adaptor pin supports, the adaptor pins each having a retracted position and an extended position such that when the adaptor pins are in their retracted position an FC-type connector is connectable to the FC receptacle in conventional fashion, and when the adaptor pins are in their extended position an ST-type connector is connectable to the FC receptacle by aligning the J-shaped notches of the ST-type connector with the adaptor pins and by pushing the ST-type connector towards the receptacle and then twisting the ST-type connector such that the adaptor pins are held by the J-shaped notches, the adaptor pins engaging the J-shaped notches from outside the ST connector.

5. A coupler according to claim 4 wherein said adaptor pins are spring loaded pins which are biased towards their extended positions.

6. A coupler according to claim 4 wherein said adaptor pins are screws, and said supports have threaded holes for receiving the screws, wherein the screws may be screwed further into the holes so as to be in the extended position, or less into the holes so as to be in the retracted position.

7. A coupler according to claim 4 wherein said adaptor pins each have a respective spaced first ring notch and second ring notch, each support has a spring and bearing mechanism capable of engaging either of the ring notches of the respective adaptor pin, wherein in each support the engagement of the spring and bearing mechanism with the respective first ring notch holds the respective adaptor pin in the retracted position and the engagement of the spring and bearing mechanism with the respective second ring notch holds the respective adaptor pin in the extended position.

8. A coupler according to claim 1 wherein said first and second receptacles are both ST-type receptacles.

9. A coupler according to claim 1 wherein said first and second receptacles are both SC-type receptacles.

10. A coupler according to claim 9 wherein said second SC receptacle is adapted to be able to receive either an SC-type connector or an ST-type connector having J-shaped notches, the coupler further comprising:
   two adaptor pin supports extending from said bushing in a direction opposite to said spring tension pins, and two adaptor pins, the adaptor pin supports being located in positions perpendicular to a longitudinal axis of the second receptacle and on opposite sides of the longitudinal axis of the receptacle in a manner which does not interfere with the connection of an ST-type connector to the ST receptacle;

the two adaptor pins being mounted retractably in said pin supports, the adaptor pins each having a retracted position and an extended position;

wherein when the adaptor pins are in their retracted position the SC-type connector is connectable to the SC receptacle in conventional fashion, and when the adaptor pins are in their extended position the ST-type connector is connectable to the SC receptacle by aligning the J-shaped notches of the ST-type connector with the adaptor pins and by pushing the ST-type connector towards the receptacle and then twisting the ST-type connector such that the adaptor pins are held by the J-shaped notches, the adapter pins engaging the J-shaped notches from outside the ST connector.

11. A receptacle according to claim 10 wherein said adaptor pins are spring loaded pins which are biased towards their extended positions.

12. A receptacle according to claim 10 wherein said adaptor pins are screws, and said supports have threaded holes for receiving the screws, wherein the screws may be screwed further into the holes so as to be in the extended position, or less into the holes so as to be in the retracted position.

13. A receptacle according to claim 10 wherein said adaptor pins each have a respective spaced first ring notch and second ring notch, each support has a spring and bearing mechanism capable of engaging either of the ring notches of the respective adaptor pin, wherein in each support the engagement of the spring and bearing mechanism with the respective first ring notch holds the respective adaptor pin in the retracted position and the engagement of the spring and bearing mechanism with the respective second ring notch holds the respective adaptor pin in the extended position.

14. A coupler according to claim 1 wherein said first receptacle is an ST-type receptacle and the second receptacle is an SC-type receptacle.

15. A coupler according to claim 1 wherein said first receptacle is an ST-type receptacle and the second receptacle is an FC-type receptacle.

16. A coupler according to claim 1 wherein said first receptacle is an FC-type receptacle and the second receptacle is an SC-type receptacle.

17. A coupler according to claim 1 in combination with said panel wherein the central opening in said panel is sufficiently large to allow a fibre optic connector to fit through the central opening.

* * * * *